UNITED STATES PATENT OFFICE.

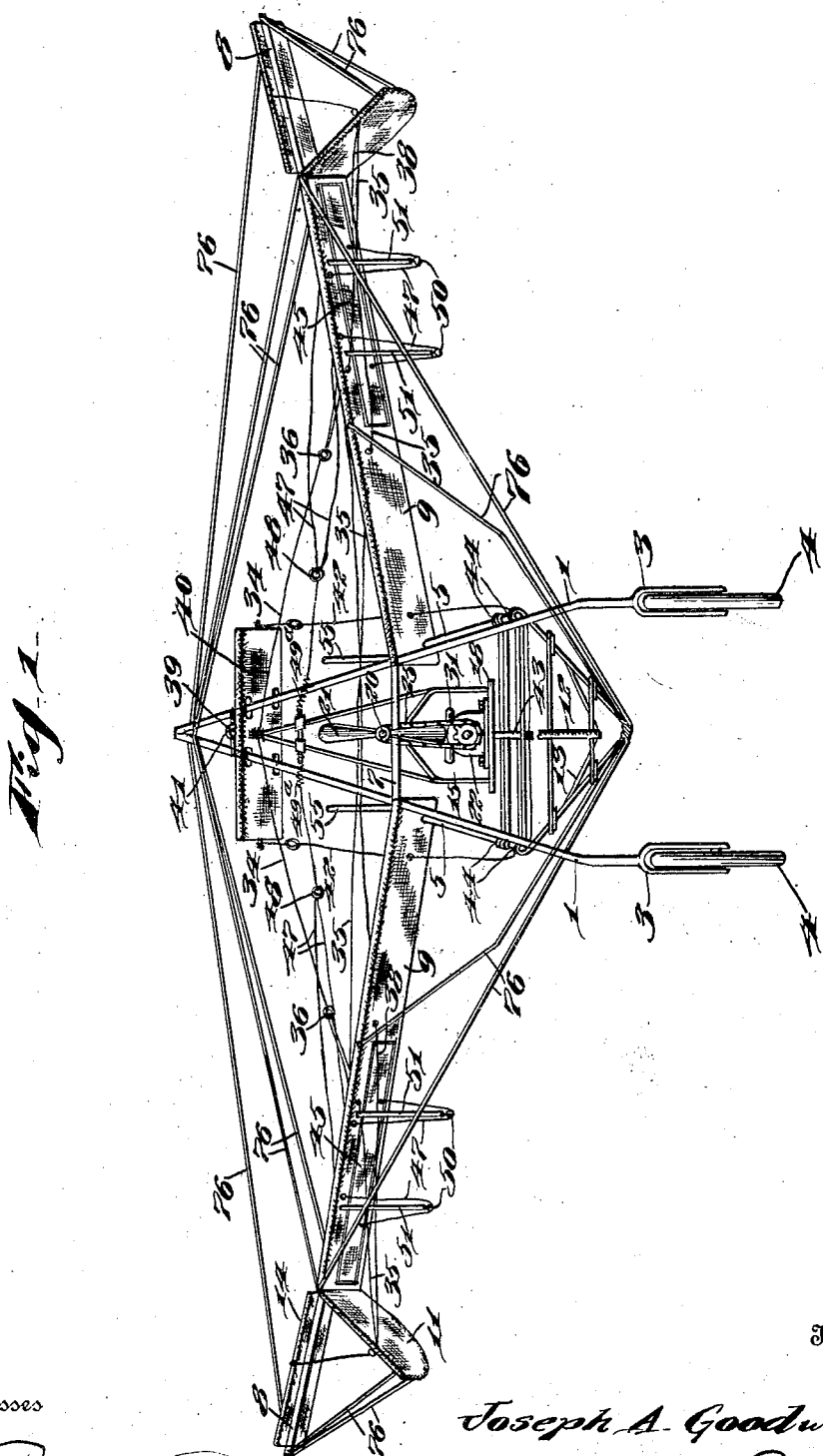

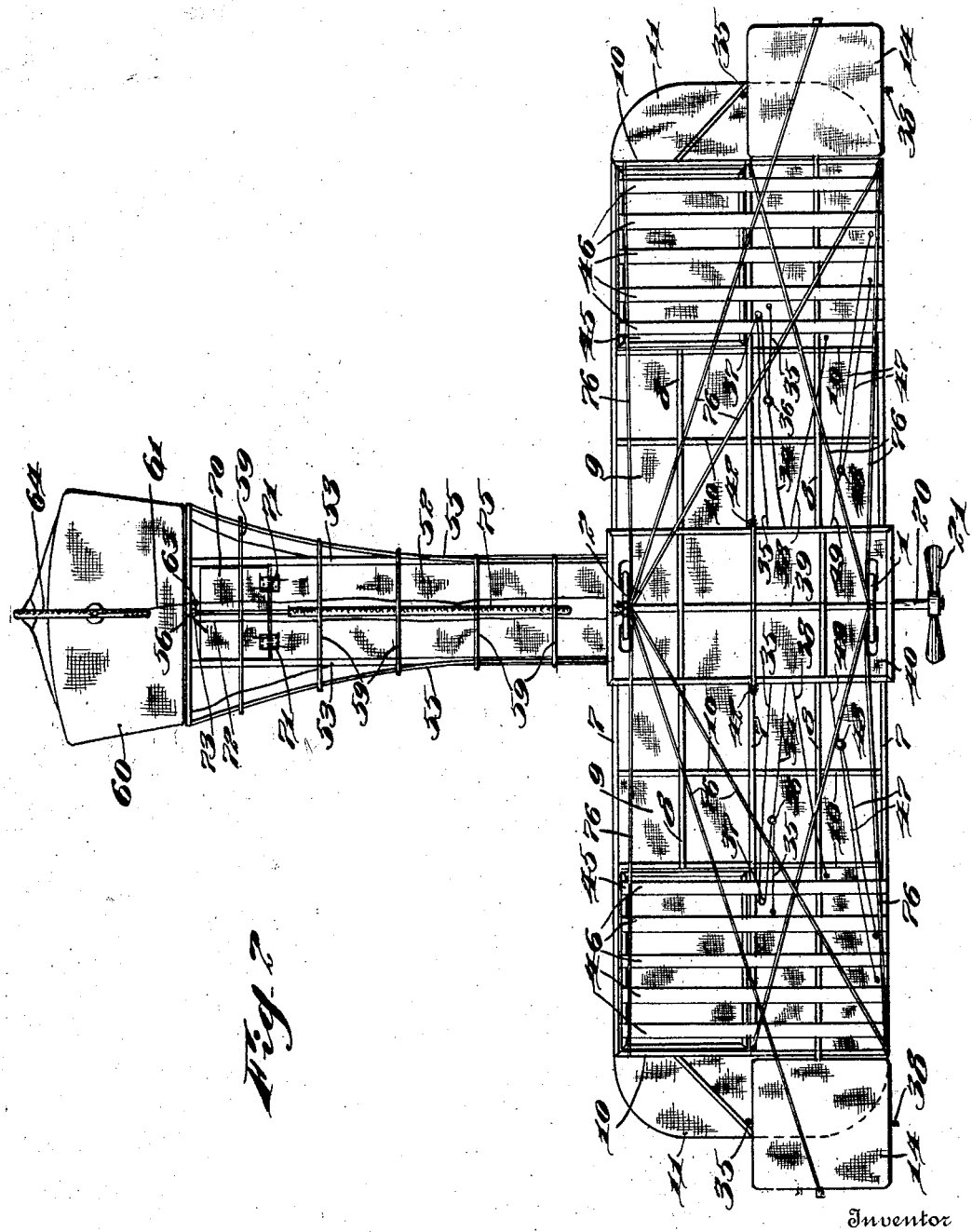

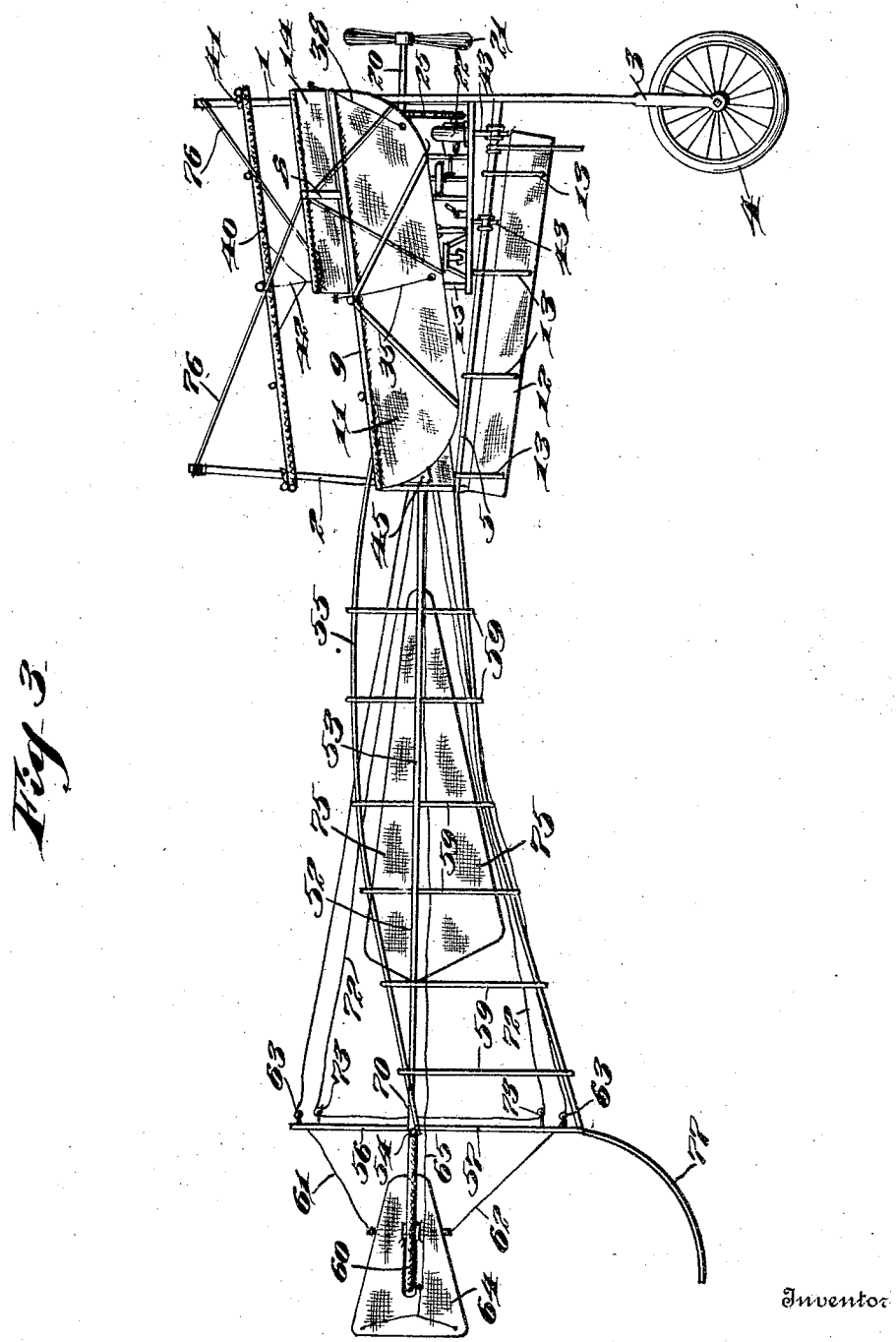

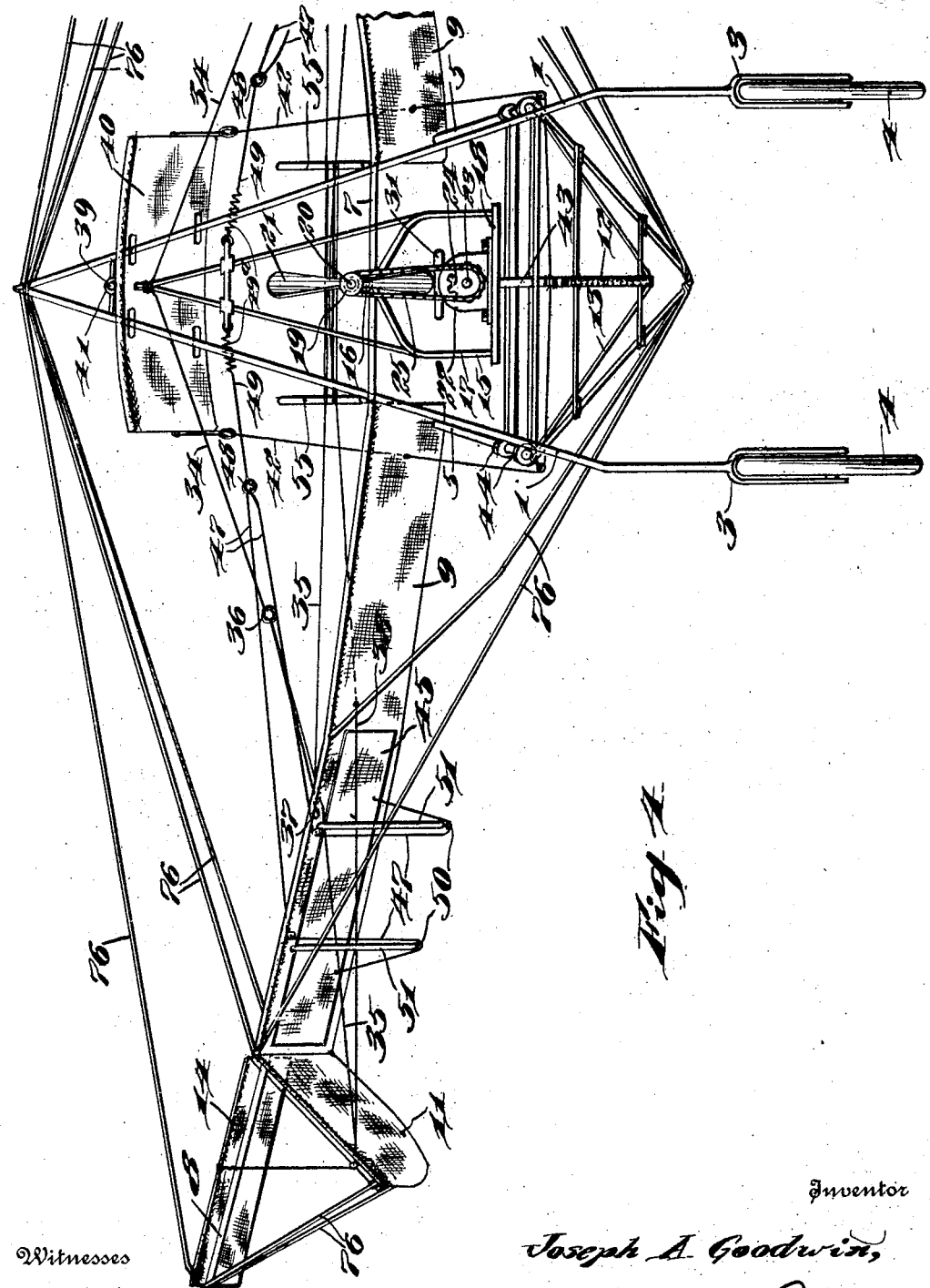

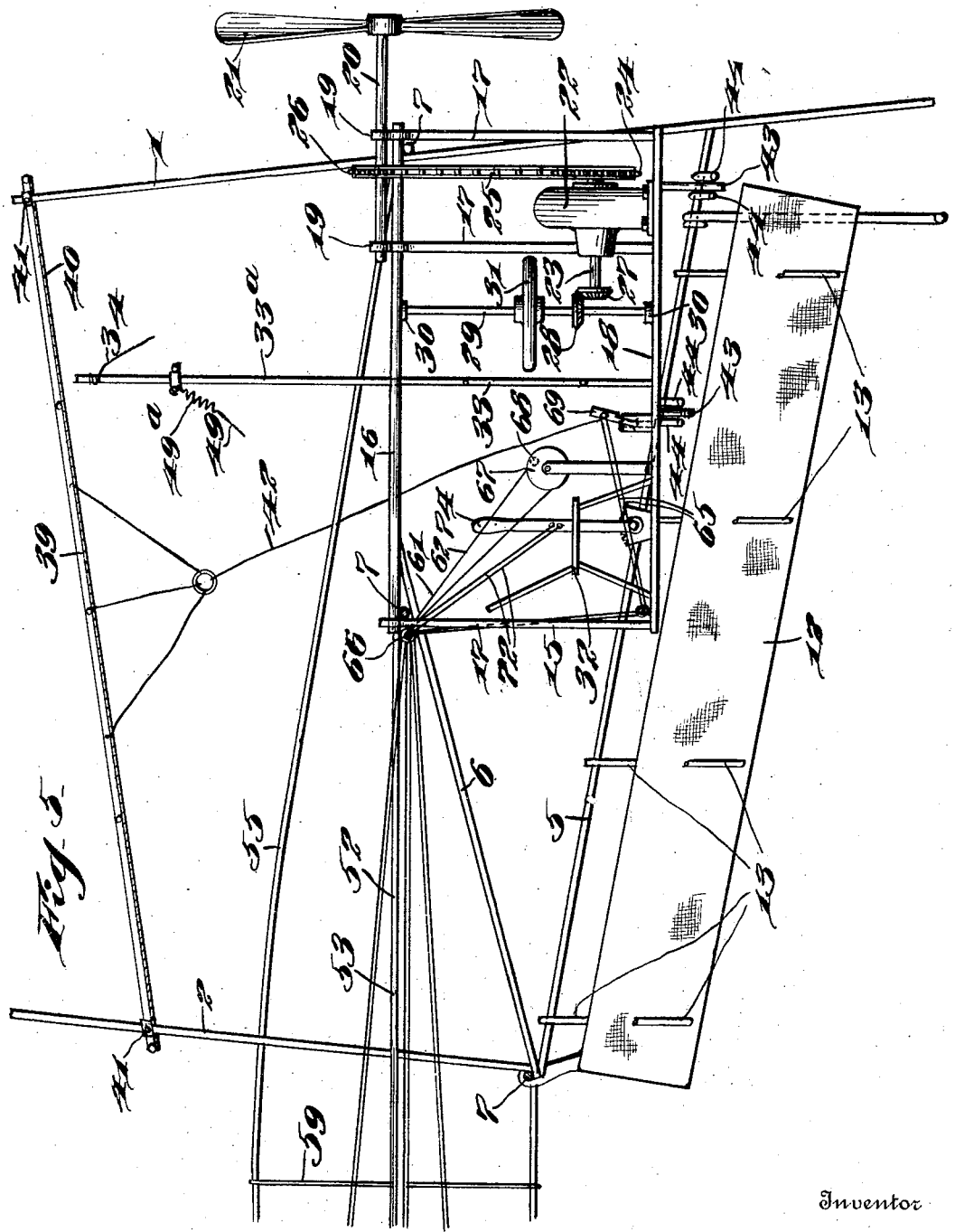

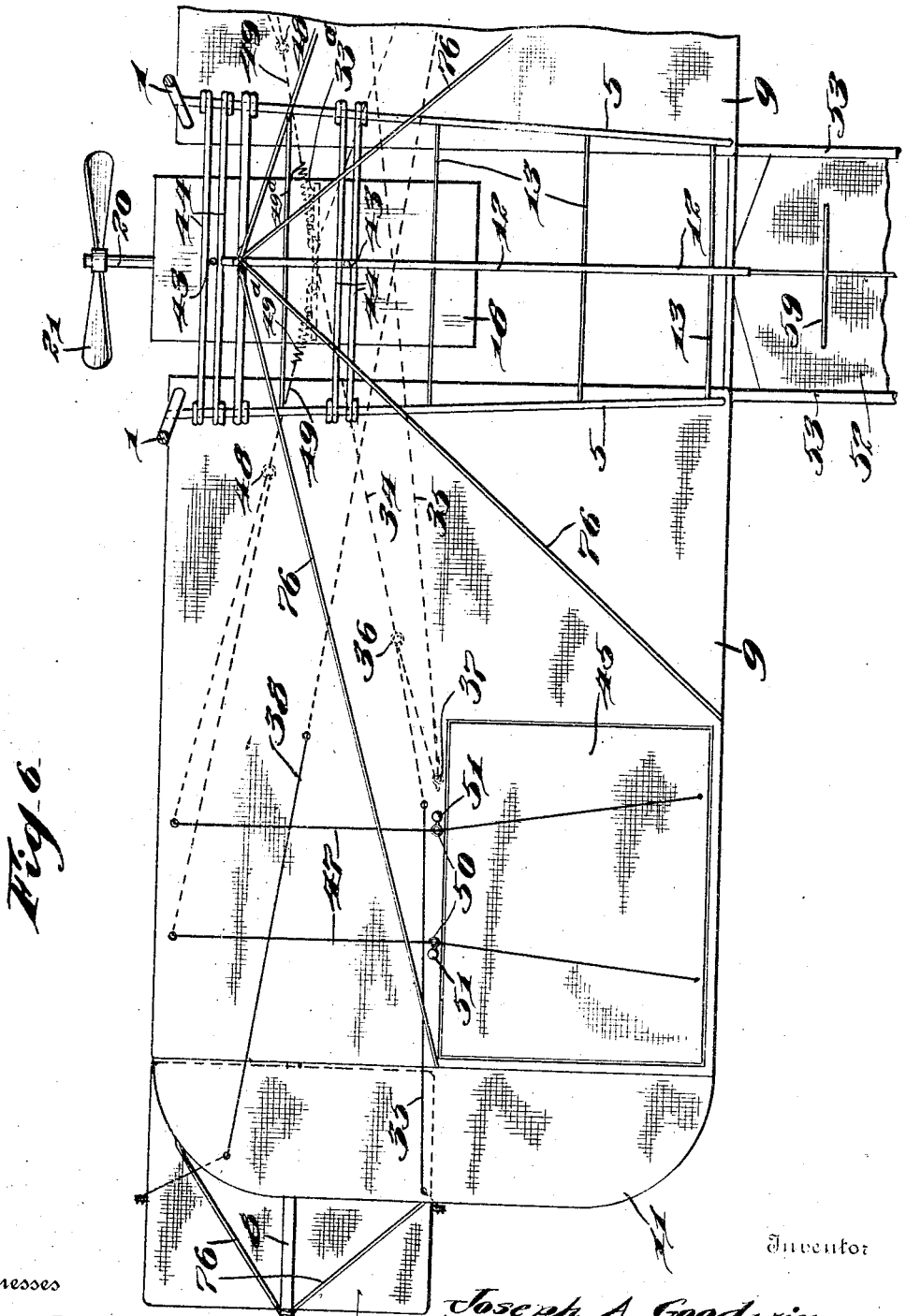

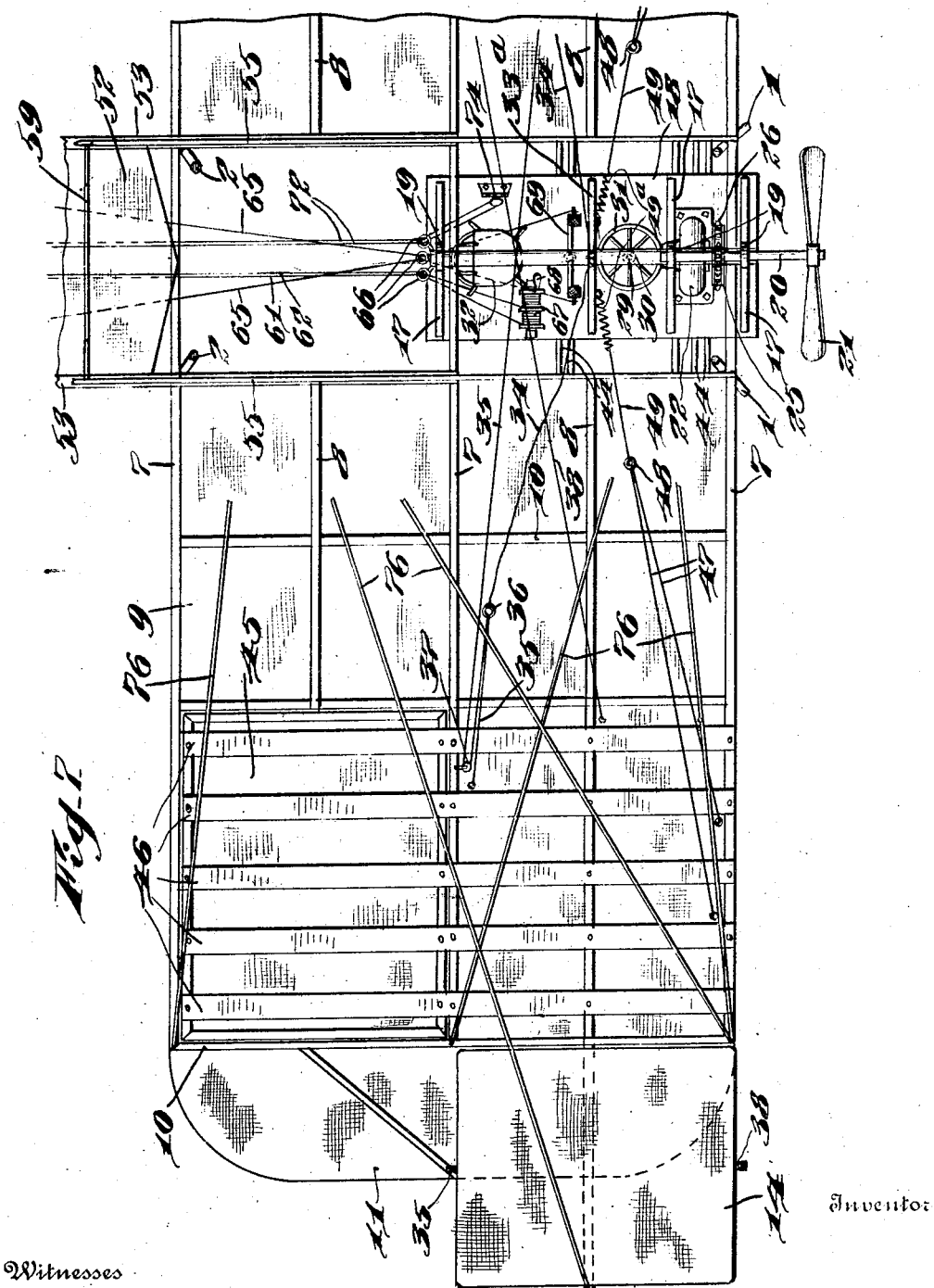

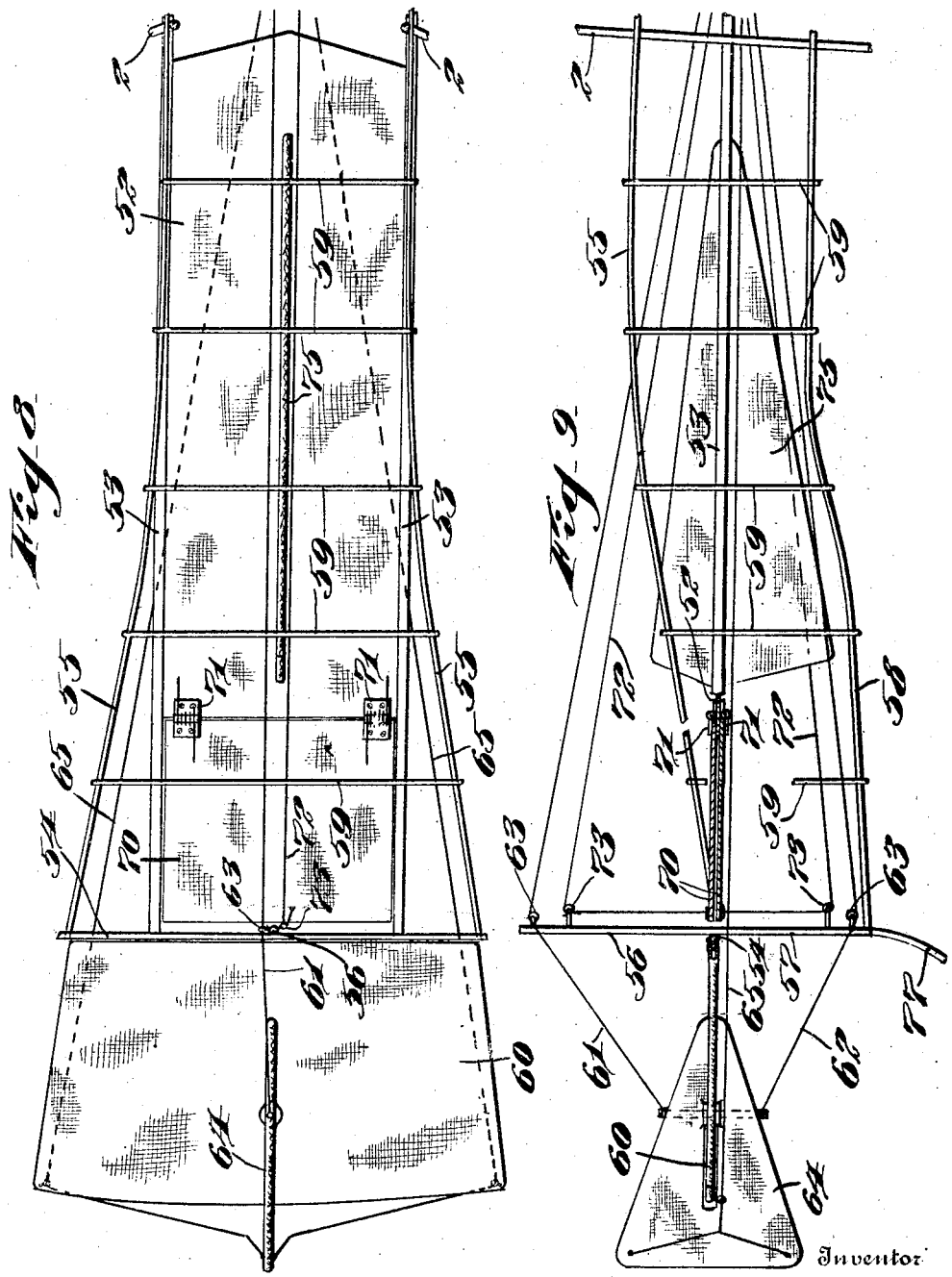

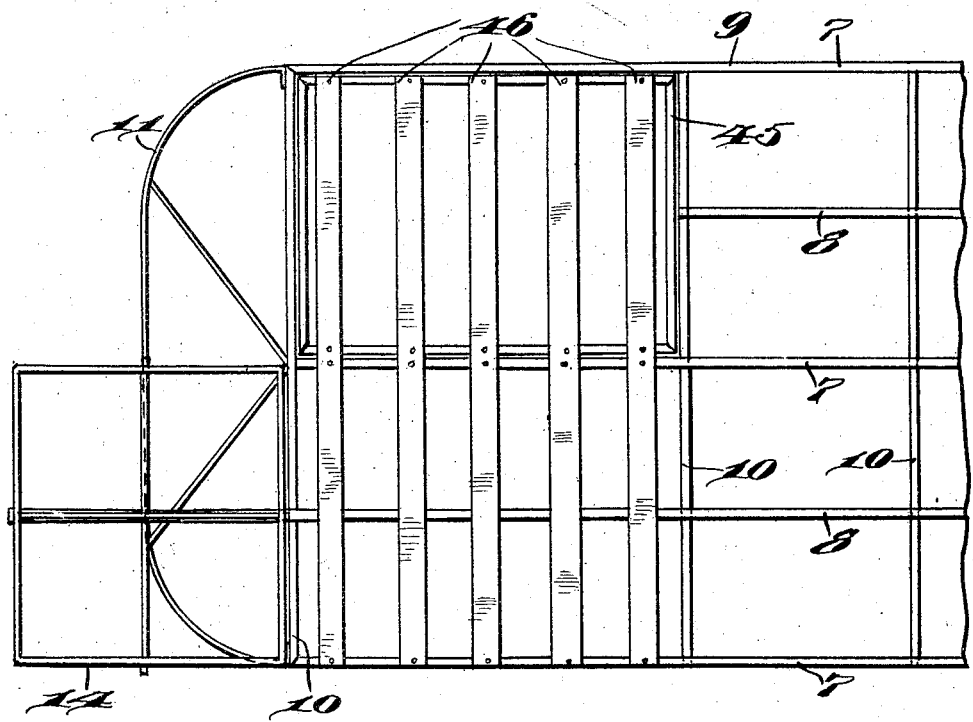
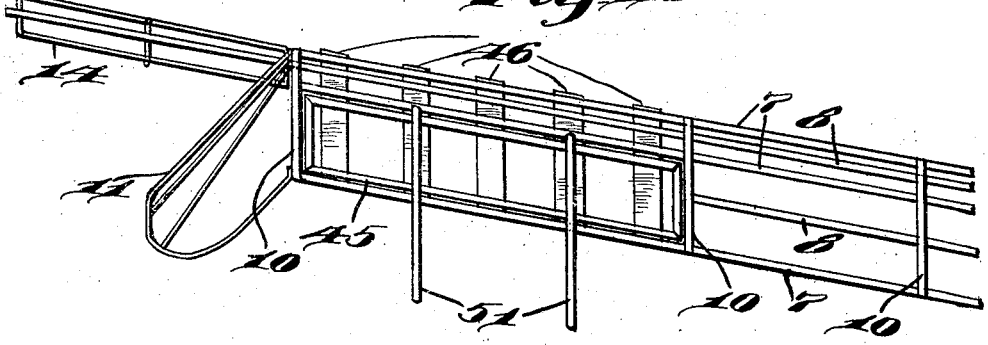

JOSEPH A. GOODWIN, OF BERKLEY, VIRGINIA.

AEROPLANE.

981,110.

Specification of Letters Patent. Patented Jan. 10, 1911.

Application filed March 25, 1910. Serial No. 551,422.

*To all whom it may concern:*

Be it known that I, JOSEPH A. GOODWIN, a citizen of the United States, residing at Berkley, in the county of Norfolk and State of Virginia, have invented certain new and useful Improvements in Aeroplanes, of which the following is a specification.

My invention relates to improvements in aeroplanes, an object of the invention being to provide an improved arrangement of wings or planes, an improved framework, and an improved automatic balance.

A further object is to provide the side wings or planes with improved tips assisting in maintaining the equilibrium of the machine.

A further object is to provide an improved construction of flexible wing sections, which are automatically controlled to maintain an equilibrium regardless of the supporting power of the air, and the difference in supporting power of the air below the different wings, and also assisting in enabling the machine to rise in the air and to gracefully alight.

A further object is to provide an improved central, open framework with upwardly inclining side wings, also with a rearwardly projecting tail, and a fore and aft equilibrium plane, above the open frame work, and provide an improved swinging frame or basket containing the motor and the means for controlling the steering mechanism, said swinging frame or basket, by gravity, maintaining a vertical position, and automatically controlling the movement of the equilibrium planes.

A further object is to provide an improved stabilizer on the rearwardly projecting tail, which is under the control of the operator at all times, said stabilizer also serving as a brake to check and control the speed of the machine.

A further object is to provide an improved arrangement of vertically disposed fins preventing the machine from skidding when rounding curves, in making a turn and assisting in maintaining an even keel in the ordinary operation, overcoming the tendency of gusts of wind to tilt the machine, and assisting to bring it back to even keel when tilted.

A further object is to provide a swinging or pivoted basket controlling the equilibrium of the machine, and provide in said basket a motor driven gyroscope preventing the basket from swinging, and also serving as a fly wheel to balance the engine, and permit the engine to be cranked by turning the gyroscope, thus enabling the machine to be started if it should stop while in flight.

A further object is to provide an improved aeroplane with an automatic balance, which will, when one part of the machine is operated upon, by variable currents of air or variable supporting qualities of air, cause a corresponding part of the machine to be moved in an opposite direction to counteract the effect, and bring the machine to an even keel, thus relieving the operator of the necessity for manually operating the equilibrium planes, allowing him to merely control the steering and the speed of the flight, and enjoy this exhilarating sport, and without the constant danger of the machine upsetting or shooting to the ground, as the equilibrium is maintained automatically.

With these and other objects in view, the invention consists in certain novel features of construction and combinations and arrangements of parts as will be more fully described and pointed out in the claims.

In the accompanying drawings: Figure 1, is a view in front elevation, illustrating my improvements. Fig. 2, is a top plan view. Fig. 3, is a view in side elevation. Fig. 4, is a broken front elevation enlarged. Fig. 5, is an enlarged fragmentary view in longitudinal section through the center frame. Fig. 6, is an enlarged broken bottom plan view. Fig. 7, is an enlarged broken top plan view, partly in section. Fig. 8, is an enlarged top plan view of the rear end of the tail. Fig. 9, is a view in side elevation of Fig. 8. Fig. 10, is an enlarged detail view, illustrating the framework at one end of a side wing, and Fig. 11, is a view in elevation of Fig. 10.

1, and 2, represent the front and rear pairs of uprights, of my improved central framework. The uprights of each pair are widest apart at their lower ends and converged to their upper ends, forming structures of general inverted V-shape. The forward uprights 1, terminate at their lower ends in forks 3, in which wheels 4, are mounted to run on the ground. These uprights 1, and 2, are connected by longitudinal rods 5, and 6.

The rods 5, and 6, converge together at their rear ends, and the upper rods 6, constitute the inner ends of the side plane or wing frames. Transverse rods 7, of a length equal to the combined wings or planes extend across, and are secured to the open, central frame formed by uprights 1, and 2, and rods 5, and 6. Three of these rods 7, are shown with intermediate rods 8, between them to strengthen the side wings, to which I give reference character 9, and it is to be understood hereinafter that when the term "side wing" is used, it is intended to mean the framework of the wing, as well as the canvas covering thereon, and to include cross rods or braces 10, which connect rods 7, and 8, at regular intervals to brace and strengthen the wings.

The wings incline downward from their front to their rear edges, and incline upward from their inner to their outer ends, which give to the wings a maximum of supporting area, and give to them a bearing on the air even when the machine tilts. In other words, if the planes were perfectly flat, and the machine tilted, it would lose its bearing in the air and shoot endwise to the earth. By inclining the planes, as shown, the front to rear incline gives the plane a riding action on the air, and the endwise inclination causes one plane to increase its bearing on the air when the machine tilts, and prevent any endwise shooting to the earth. To further assist the side wings in maintaining an equilibrium and restoring them to an equilibrium when tilted, I provide at the outer end of each wing a tip 11. These tips are of canvas, reinforced with light framework, and are straight from front to rear but are disposed at an angle to the wings, and project downward. These tips offer practically no resistance to the flight of the machine, as they present a sharp edge to the line of movement, but when the machine is tilted, it causes the tip 11, at the lower end of the downwardly tilting wing to assume more of a vertical position, directly catching the wind, and causing the machine to assume a horizontal position. As an additional means for compelling the machine to right itself when tilted, I provide a longitudinal fin 12, which is supported centrally below the open framework at the center of the machine, and is secured by suitable rods 13. This fin 12, also serves to prevent lateral skidding movement when rounding curves in making a turn, for the machine naturally assumes an incline in making a turn, and this fin 12, bearing against the air, prevents undue lateral movement, and undue tilting movement, causing the machine to quickly resume a horizontal, as it proceeds in straight flight.

14, 14, represent equilibrium planes, which are located at the outer ends of wings 9. These equilibrium planes are preferably of a length equal to about one-half of the width of wings 9, and are pivotally supported upon the forward rods 8, so that the planes 14, pivot up and down at their front and rear ends. These equilibrium planes 14, are controlled and operated by my improved pivoted basket 15, as will now be described in detail.

A longitudinal shaft 16, is secured to the rods 7, and hangers 17, are mounted to swing on this shaft 16, are of general inverted V-shape, and are secured at their lower ends to a platform 18, and it is these hangers 17, and platform 18, to which I refer when I use the terms swinging frame or basket. The forward pair of hangers 17, are provided above shaft 16, with bearings 19, in which a shaft 20 is mounted, and projects forward of the frame or basket, and has a propeller 21, secured thereon.

A motor 22, is secured on platform 18, and the motor shaft 23 is provided with a sprocket wheel 24, connected by a sprocket chain 25, with a sprocket wheel 26, on the propeller shaft 20. Motor shaft 23, also has a beveled gear 27, in mesh with the beveled gear 28, on a vertical shaft 29, mounted in suitable bearings 30, and having a large, balanced, heavy wheel 31, fixed thereon, and located in horizontal position forming a gyroscope.

The rapid revolution of the wheel, serves to hold the basket or swinging frame in a vertical position, and overcoming any tendency to swing. Back of the gyroscope, the operator's seat 32 is provided on platform 18, and between the seat 32, and the gyroscope, an open framework or partition 33, is provided to protect the operator from the gyroscope, and prevent him from accidentally touching the same while it is revolving. However, should the motor stop in midair, the operator may turn the gyroscope wheel manually, to crank the motor 24, and start the same.

An upright 33ª, constitutes an upward extension of the partition 33, and projects above the same, and is secured to wires 34, which control the operation of the equilibrium planes 14. A wire 35, is secured to the rear end of one of the planes 14, then extends downward through the framework of tip 11, then along the wing 9, thence up through the wing, and through a ring 36, secured to the end of a wire 34, thence downward through a pulley 37, fixed to the wing, thence across the open framework at the center of the machine, thence downward through the opposite wing and tip, and secured to the front end of the other equilibrium plane. A second wire 38, which connects the front end of the first mentioned plane 14, with the rear end of the other, is disposed in precisely the same way as above described in connection with the wire 35.

In other words, the wires 34, by means of their rings 36, when the swinging frame or basket 15 is at an angle to the wings, one of these wires 34 will compel the equilibrium planes 14 to tilt in opposite directions, the plane at one end tilting upwardly, and the plane at the other end tilting downwardly so that they will properly catch the air and compel the machine to assume its normal position.

Above the basket or swinging frame 15, and pivotally mounted on a longitudinal rod 39, is what I term a fore and aft equilibrium plane 40. Rod 39 is secured at its ends in cross bars 41, connecting uprights 1, and 2. This rod 39 turns in rods 41, and the plane 40 is permitted a tilting movement up and down at its side edges relative to the main framework. The side edges of this plane 40, are connected by wires 42, with the side edges of platform 18, so that the platform 18, and the plane 40 are maintained in uniform, approximately parallel relation with each other at all times. Hence, regardless of the incline of the wings 9, the plane 40 will always maintain a horizontal position, and hold its bearing on the air, and this will absolutely prevent any possibility of the machine shooting endwise to the earth, as plane 40 will sustain it until the main wings right themselves.

To relieve the basket or swinging frame from torsional strain, depending pins or lugs 43 are located and moved between parallel rods 44, on the fixed frame, so that the basket can only swing in one direction, or the reverse, that is, the frame of the flying machine, and can only swing transversely, relative to the basket for the basket maintains a uniform vertical position. I therefore wish it understood that when I refer to the swinging frame or basket, I intend this term to mean a basket having pivotal relation with the frame of the machine, so that the parts may pivot relative to each other, and the frame or basket 15, is not intended to swing, but is intended to maintain a stationary vertical position, while the frame of the machine tilts, and the difference in relative position between the frame 15, and the frame of the flying machine cause the equilibrium planes 14, and 40 to move and compel the machine to right itself.

Each wing 9, is provided with an opening in which a spring section 45 is located, said spring section constituting a part of the side wing, yet flexible and elastic with relation to the side wings, and I term these sections elastic wings. They may, of course, be formed in various ways, a preferred structure being illustrated, in which flexible spring slats 46, are secured to the body of the wings 9, and to the elastic wings 45, and serve to connect wings 9 and the elastic wings together, to hold the elastic wings in normal position, but permit them to move as they are operated upon by the pressure of air, and return them to normal position. These elastic wings are connected by wires 47, with rings 48 at the ends of wires 49, said wires 49 being fixed to upright 33ª. The wires 47 are passed through pulleys 50, at the lower end of posts 51, depending from wings 9, so that when a pull is had upon the wires, the free ends of the elastic wings will be drawn downward. Also it will be noted that when the upright 33ª, swings in one direction to pull down the elastic wing 45 on one side of the machine, the other wires 47 will become slack, so that the wing to which they are connected is free to ride up, thus the elastic wings will operate reversely to each other, so as to cause the machine to right itself. These elastic wings have a wide range of utility. One of the essential advantages they possess is that they enable the wings to have an equal support on the air, regardless of the supporting quality of the air. For example, it is well known that when a shadow falls across one wing, the colder air in the shadow has a less supporting quality than the warmer air, and this will cause the machine to tilt. This is rectified by the elastic wings, which give in accordance with the pressure below, and the machine maintains its equilibrium. This is not the only function of the elastic wings, as they are also very useful in starting and alighting, and while I have shown them of a particular size, my invention is in no wise limited to the proportions of these wings, as they may be made in any size to suit.

52, represents the tail of the machine which comprises longitudinal rods 53, secured to the main central frame, and connected by a filling of canvas. At the rear end of the tail, a cross rod 54 is located, and the tail is strengthened by arched rods 55, which are secured to both of the uprights 1, and 2, and constitute a truss, adding strength to the framework. Vertical posts 56, and 57 extend up from and down from the center of cross rod 54, and the lower post 57 is connected by rod 58, with the main frame of the machine, and transverse stays 59 are located at suitable intervals to give sufficient strength to the tail. To rod 54, a horizontal rudder 60 is pivotally connected and this rudder is moved by wires 61 and 62, which pass through pulleys 63 on posts 56, and 57.

64, is a vertical rudder pivoted on rudder 60, and operated by wires 65. These wires 61, 62, and 65, extend along the tail, and pass through rings 66. The wires 61 and 62, are secured upon a rotary drum 67, turned by crank 68, located adjacent the operator's seat 32.

69, is a foot lever fulcrumed between its ends and to which the two wires 65, are connected, so that the operator can with his feet swing the rudder 64, while with one hand move rudder 60.

At the rear end of the tail, above and below the tail, I provide what I term stabilizers 70. These stabilizers are in the form of planes or wings, which are connected by spring hinges 71, to the tail and at their rear free ends are connected to wires 72, which are passed through pulleys 73, on posts 56 and 57, and then pass along the tail, and through one of the rings 66, and are secured to a lever 74, adjacent the operator's seat. When the operator swings this lever 74 forwardly, the stabilizers 70, will be moved away from the tail, thus serving to, in effect, spread or thicken the tail, so as to retard the speed, and restore an equilibrium. These are especially desirable if the machine should tilt fore and aft, as they will catch the air, check the momentum, and right the machine.

The tail 52, is provided with a vertical fin 75, which extends longitudinally of the tail, and above and below the tail, being preferably deeper below the tail than higher above, and this fin 75, serves to aid in maintaining the equilibrium of the machine.

Suitable stay rods and braces 76, are utilized to strengthen the structure, and hold the side wings in place, and a runner 77 is located at the rear and lower end of the tail, which is adapted to strike the ground in alighting, and bring down the forward end of the machine so that the wheels 4, will run on the ground.

While I have above set forth a preferred construction, and enumerated some of the advantages and functions of the numerous novel features of construction, I do not wish it understood that I limit myself to the particular structure, and a great many slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In an aeroplane, the combination with a central frame, of side wings secured to the central frame, tips on the free ends of the side wings at an angle to the wings, equilibrium planes at the free ends of the wings, and an equilibrium plane in the upper portion of the central frame, higher than the side wings, substantially as described.

2. In an aeroplane, the combination with a central frame, of side wings secured to the central frame, tips on the free ends of the side wings, at an angle to the wings, equilibrium planes at the free ends of the wings, an equilibrium plane in the upper portion of said central frame, and means compelling all of said equilibrium planes to move simultaneously, substantially as described.

3. In an aeroplane, the combination with a central frame, side wings secured to the frame, and a rearwardly projecting tail secured to the frame, of equilibrium planes at the ends of the side wings, an equilibrium plane in the top of the central frame, a swinging basket or frame in the central frame, wires connecting the equilibrium planes with the basket, and vertical and horizontal rudders on the rear end of the tail, substantially as described.

4. In an aeroplane, the combination with a central open frame, side wings secured to the frame, and a rearwardly projecting tail secured to the frame, of a longitudinal shaft supported in the frame, a basket pivotally supported on said shaft, and depending therefrom, a propeller shaft supported by the basket adjacent the first mentioned shaft, a propeller on said propeller shaft, a motor on the basket driving said propeller shaft, equilibrium planes at the ends of the side wings, an equilibrium plane above the side wings, and supported by the central frame, and wires connecting said equilibrium planes to the basket, substantially as described.

5. In an aeroplane, the combination with a central open frame, side wings secured to the frame, and a rearwardly projecting tail secured to the frame, of a longitudinal shaft supported in the frame, a basket pivotally supported on said shaft, and depending therefrom, a propeller shaft supported by the basket adjacent the first mentioned shaft, a propeller on said propeller shaft, a motor on the basket driving said propeller shaft, elastic sections in said side wings, and wires connecting said sections to the basket, substantially as described.

6. In an aeroplane, the combination with a central open frame, side wings secured to the frame, and a rearwardly projecting tail secured to the frame, of a longitudinal shaft supported in the frame, a basket pivotally supported on said shaft, and depending therefrom, a propeller shaft supported by the basket adjacent the first mentioned shaft, a propeller on said propeller shaft, a motor on the basket driving said propeller shaft, equilibrium planes at the ends of the side wings, an equilibrium plane in the central frame above the side wings, elastic sections in said side wings, and wires connecting said equilibrium planes and elastic wing sections to said basket, substantially as described.

7. In an aeroplane, the combination with a central frame, of side wings secured to the frame, a tail secured to the frame, pivotally supported equilibrium planes at the ends of the side wings, a normally horizontal equilibrium plane disposed above the central frame and at a higher elevation than the side wings, and a swinging basket or frame in the central frame, controlling the operation of the equilibrium planes, substantially as described.

8. In an aeroplane, the combination with a central open frame, side wings secured to the frame, and a rearwardly projecting tail secured to the frame, of a longitudinal shaft supported in the frame, a basket pivotally supported on said shaft, and depending therefrom, an equilibrium plane supported above the frame, wires connecting said equilibrium plane with the basket, a propeller shaft supported by the basket adjacent the first mentioned shaft, a propeller on said propeller shaft, a motor on the basket driving said propeller shaft, steering mechanism, and means in the basket for operating said steering mechanism, substantially as described.

9. In an aeroplane, the combination with a central open frame, side wings secured to the frame, and a rearwardly projecting tail secured to the frame, of a longitudinal shaft supported in the frame, a basket pivotally supported on said shaft, and depending therefrom, an equilibrium plane supported above the frame, wires connecting said equilibrium plane with the basket, a propeller shaft supported by the basket adjacent the first mentioned shaft, a propeller on said propeller shaft, a motor on the basket driving said propeller shaft, and a gyroscope in said basket driven by the motor, substantially as described.

10. In an aeroplane, the combination with a central open frame, side wings secured to the frame, and a rearwardly projecting tail secured to the frame, of a longitudinal shaft supported in the frame, a basket pivotally supported on said shaft, and depending therefrom, an equilibrium plane supported above the frame, wires connecting said equilibrium plane with the basket, a propeller shaft supported by the basket adjacent the first mentioned shaft, a propeller on said propeller shaft, a motor on the basket driving said propeller shaft, horizontally disposed balance wheel in said basket driven by the motor, an operator's seat in the basket back of the balance wheel, an openwork partition between the balance wheel and operator's seat, steering mechanism, and devices in the basket adjacent the operator's seat for controlling the steering mechanism, substantially as described.

In testimony whereof I have signed my name to this specification in the presence of two subscribing witnesses.

JOSEPH A. GOODWIN.

Witnesses:
CLEON HANNA,
CLARK S. NORMAN.